(12) United States Patent
Harvey

(10) Patent No.: US 6,753,671 B1
(45) Date of Patent: *Jun. 22, 2004

(54) RECHARGER FOR USE WITH A PORTABLE ELECTRONIC DEVICE AND WHICH INCLUDES A PROXIMALLY LOCATED LIGHT EMITTING DEVICE

(76) Inventor: Thomas Patrick Harvey, 1603 W. Lake Dr., Novi, MI (US) 48377

( * ) Notice: Subject to any disclaimer, the term of this patent is extended or adjusted under 35 U.S.C. 154(b) by 105 days.

This patent is subject to a terminal disclaimer.

(21) Appl. No.: 10/124,505

(22) Filed: Apr. 17, 2002

Related U.S. Application Data

(60) Provisional application No. 60/284,370, filed on Apr. 17, 2001.

(51) Int. Cl.[7] ............................................. H01M 10/46
(52) U.S. Cl. ...................................... 320/107; 320/132
(58) Field of Search .................. 320/DIG. 18, DIG. 21, 320/107, 110, 112, 113, 114, 132

(56) References Cited

U.S. PATENT DOCUMENTS

| | | |
|---|---|---|
| 4,998,055 A | 3/1991 | Nash et al. ..................... 320/2 |
| 5,602,455 A | 2/1997 | Stephens et al. ................ 320/2 |
| 5,621,299 A | 4/1997 | Krall .............................. 320/5 |
| 5,646,505 A | 7/1997 | Melnikov et al. ............. 320/21 |
| 5,736,830 A * | 4/1998 | Weng |
| 5,861,729 A | 1/1999 | Maeda et al. ................ 320/106 |
| 5,889,382 A | 3/1999 | Jung ........................... 320/106 |
| 6,008,620 A | 12/1999 | Nagano et al. ............. 320/106 |
| 6,075,347 A | 6/2000 | Sakakibara .................. 320/150 |
| 6,104,167 A | 8/2000 | Bertness et al. ............ 320/132 |
| 6,204,640 B1 | 3/2001 | Sakakibara .................. 320/150 |
| 6,204,641 B1 | 3/2001 | Sakakibara .................. 320/153 |
| 6,281,425 B1 | 8/2001 | Price ........................... 136/244 |
| 6,304,060 B1 | 10/2001 | Dernehl ....................... 320/132 |
| 6,316,911 B1 | 11/2001 | Moskowitz et al. ........ 320/114 |
| 6,331,761 B1 | 12/2001 | Kumar et al. ............... 320/132 |
| 2001/0009362 A1 | 7/2001 | Sakakibara .................. 320/150 |
| 2001/0048289 A1 | 12/2001 | Sakakibara .................. 320/150 |

* cited by examiner

Primary Examiner—Edward H. Tso
(74) Attorney, Agent, or Firm—Gifford, Krass, Groh, Sprinkle, Anderson & Citkowski, P.C.

(57) ABSTRACT

An improved recharger for a portable electronic device includes a light emitting device affixed to the device connector terminus. A translucent or transparent portion is optionally provided through which the light emitting device shines. The light emitting device activation is indicative of the completion of an electrical circuit with a device to be recharged or is indicative of battery charge status.

16 Claims, 3 Drawing Sheets

RECHARGER FOR USE WITH A PORTABLE ELECTRONIC DEVICE AND WHICH INCLUDES A PROXIMALLY LOCATED LIGHT EMITTING DEVICE

RELATED APPLICATION

This application claims priority of U.S. Provisional Patent Application No. 60/284,370 filed Apr. 17, 2001 and is incorporated herein by reference.

FIELD OF THE INVENTION

The present invention relates to recharging of portable electronic devices in general, and more particularly, to a recharger having a light emitting device proximal to a device connector terminus.

BACKGROUND OF THE INVENTION

Many low cost portable electronic devices such as hand-held computers and microcassette recorders are powered by disposable batteries. Thus, devices powered by disposable batteries are always susceptible to power loss at inopportune moments. Portable electronic devices intended for recharging must be engineered to incorporate circuitry for assuring that in-device battery recharge will not damage the device proper. Alternatively, rechargeable batteries are removed from the device for recharging. In the former instance, the additional circuitry to monitor in-device recharging adds expense and complexity and thereby makes retrofitting of a device intended for use with disposable batteries both difficult and cumbersome. Removing batteries for recharge disrupts device usage and causes excessive device wear.

Conventional rechargers often contain an LED indicator integral with a power source adapter. The LED indicator affording information regarding the completion of a charging circuit or the charge status of the battery. In instances where the power source adapter is a plug that couples with an alternating current power source, the LED indicator integral therewith is frequently located at a remote wall socket or otherwise inconvenient location to check for LED illumination. Likewise, where the power source adapter is configured to engage a vehicle cigarette lighter, an LED integral with the power source adapter and proximal to the cigarette lighter is typically remote from the location of a charging device and represents a distraction during vehicle operation. Alternatively, indicator LEDs have been incorporated into a recharger housing that serves to cradle a battery or device during the charging process. U.S. Pat. No. 6,316,911 is an example of such ahousing. A supporting housing with an LED indicator suffers the limitation of increasing the size of a recharger system beyond the footprint of the portable device intended to couple thereto. Thus, there exists a need for a portable electronic device recharger having a compact connector terminus including an indicator LED.

SUMMARY OF THE INVENTION

Generally, a power source adapter is provided to condition the power to be utilized by the electronic device. The adapter may include a transformer and converter that each act on the source power to adapt it for use by the recharger control circuitry for subsequent communication to subject portable electronic device.

An electrical conductor connects to the power adapter in a manner that allows the power adapter to be in electrical communication with a device connected to the opposite end of the conductor.

A connector terminus having a terminal housing that includes a charging control circuit is connected to the electrical conductor at an end opposite the power adapter. The connector terminus includes a coupling means for connecting to the electronic device and is not a docking unit for receiving or cradling the device. Most importantly, the terminus includes an indicator light emitting device whereby the user of the recharger can determine the charging state of the device by the illumination state of the light emitting device.

A battery compartment cover is installed such that the through holes therein are in alignment with the terminus coupling of the battery pack to permit coupling with the connector terminus.

The power adapter of the recharger is connected to a power source whereby the transformer/converter circuitry conditions the power for use by the electronic device.

The connector terminus is then connected to the terminus coupling through the replacement battery compartment cover to begin the charging process.

During charging, the light emitting device on the connector terminus optionally flashes at a steady frequency as an indication that normal charging is occurring. When the rechargeable battery has obtained its maximum charging capacity, the light emitting device stops flashing and remains on at a steady state condition. However, once the rechargeable battery has reached its capacity and the electronic device is operated while the recharger is still attached, the light emitting device will occasionally flash as an indication that the power being expended from the batteries is being replaced on a periodic basis. Alternatively, the same light emitting device or a different light emitting device simply activates upon coupling to a power source and/or the completion of a recharge circuit therewith and the subject device.

DETAILED DESCRIPTION OF THE PREFERRED EMBODIMENT

An improved portable electronic device recharger has utility in providing a non-supporting connector terminus that includes a light emitting device that is visible proximal to the subject portable device. When the terminus is connected to the device, the light emitting device indicates charging status through various modes of illumination. It is appreciated that inventive components included in the portable electronic device recharger as detailed herein are readily shifted in location between invention element structures of power source adapter, connector terminus and the battery, with the proviso that the light emitting device indicating charge status resides in the connector terminus proximal to the subject portable device.

As used herein "light emitting device" is defined to include a component that emits light upon being energized, and includes a light emitting diode, incandescent bulb, and a light emitting polymer.

Figure 1:
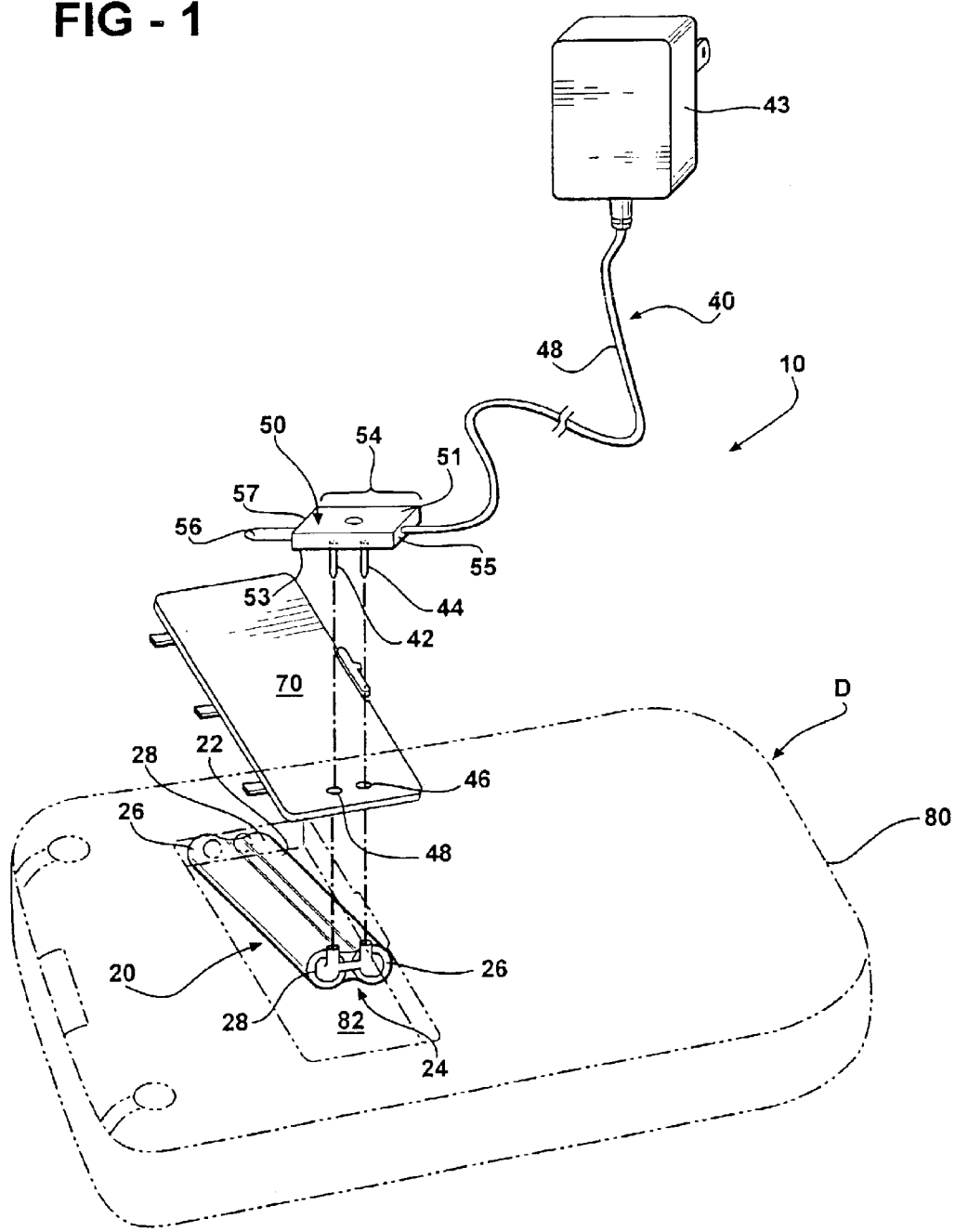
FIG. 1 is an exploded view of a recharger according to the present invention, the device depicted in phantom.

As illustrated in FIG. 1, a portable electronic device recharger 10 is generally shown for use with an electronic device D having a battery (not shown), a battery compartment 82 and a battery compartment cover (not shown).

A power adapter 40 includes a transformer and converter portion 43, an electrical conductor cord 48 and a connector terminus 50.

The transformer/converter 43 engages a conventional power source and adapts the raw power to the specific power requirements of the electronic device D for which the device recharger 10 is to be utilized with. An electrical power source according to the present invention is appreciated to illustratively include line current, a vehicle electrical system or solar energy. In this instance the electrical energy source is line power, namely 120 volts AC at 60 hertz, and a conventional transformer/converter 43 is coupled thereto. The transformer/converter 43 reduces the line voltage to a predetermined value typically ranging from 1 to 36 volts DC and preferably 5 volts DC. The transformer/converter may be adapted for use with European line source power which is typically 220 volts at 50 hertz AC.

An electrical conductor cord 48 is attached to and extends from the transformer/converter 43 that allows for the device D to be in electrical communication with the transformer/converter 43 when attached to the opposite end of the conductor 48. Preferably, the conductor 48 is of a twin lead 20 AWG, but other types of conductors may be used without exceeding the scope of the invention.

A connector terminus 50 is in electrical communication with the electrical conductor 48 at its opposite end from the transformer/converter 43. The connector terminus 50 provides a terminal housing 54 and a charging control circuit therein that includes a charging status indicating light emitting device 60. Preferably, the light emitting device is a light emitting diode of any wavelength emitting color, illustratively including red, orange, yellow, green, blue, white, and violet.

The terminal housing 54 includes a top face 51, a bottom face 53, a first end 55 and a second end 57. The electrical cord that extends from the transformer/converter 43 attaches to the first end 55 of the terminal housing 54 whereby conditioned electrical power is provided to the charging control circuit therein. It is appreciated that the housing 54 herein is merely illustrative as other configurations may be employed without exceeding the scope of the invention such as a coaxial connector or the like.

In a preferred embodiment, the second end 57 is flared relative to the first end 55 to form a grips surface. Alternatively, it is appreciated that a pull tab 56 may extend from the second end 57 of the terminal housing 54 to provide a means for grasping and disconnecting the terminal housing 54 from a device D.

The terminal housing 54 is electrically insulated with electrical charging contacts 42 and 44 extending normal to the bottom face 53 of the terminal housing thus being the only electrical conductor portions extending from the charging control circuit (not shown). In the preferred embodiment, the charger contacts are male pins but alternatively may be female sockets for electrically coupling to the device D.

The connector terminus 50 has a light emitting device 60 visible at the top face 51 of the housing 54. It is appreciated that the type and position of the light emitting device 60 on the terminus 50 is herein merely illustrative as other types and positions may be employed without exceeding the scope of the invention. It is appreciated that there are several modes by which a light emitting device communicates information, these include temporal variations in activation frequency, color, and intensity of patterns defined by single or multiple light emitting devices. Further, the connector terminus 50 is designed to couple to the device D in a plug and socket fashion, including coaxial connector or the like, and does not cradle or receive the device D in a docking fashion. In the preferred embodiment, the mass of the terminus 50 is small relative to that of the device D and attaches such that a user can grasp, hold and operate the device as normal limited only by the length of the conductor 48. The light emitting device 60 indicates charging status.

A battery pack 20 is receivable within the battery compartment 82 of the portable device D. The battery pack 20 includes at least one rechargeable cell 22 but as illustratively shown in FIG. 1, the battery pack 20 containing two cells 22 are oriented with adjacent opposing poles 26 and 28 respectively. A rechargeable cell 22 according to the invention illustratively includes nickel metal hydride, nickel cadmium, lithium and polymeric cells.

A terminus coupling 24 is in electrical contact with the adjacent opposing poles 26 and 28 respectively of the cells 22. The coupling 24 receives complementary electrical contacts 42 and 44 from the connector terminus 50. As such, the terminus coupling 24 is a pair of matable sockets electrically coupled only through the cell 22 and capable of receiving electrical contacts 42 and 44. Here again, it is appreciated that the terminus coupling 24 and the complementary electrical contacts may be inverted such that the terminus coupling 24 is a male type adapted to couple with a complementary female type of the electrical contacts. A terminus coupling 24 is likewise half of a matable pair of coaxially located blades.

The battery pack 20 spans the battery compartment to electrically communicate with the battery contacts of the device D. Based on the recharger cell 22 dimensions, a spacer (not shown) may be provided to bridge the distance between the distal poles of the battery cell 22 and the contacts of the device D.

Charger control circuitry (not shown) is enclosed within the connector terminus 50 and operates to regulate the flow of charging current to the battery pack 20 while controlling the indicator light emitting device 60. The charger control circuit senses the presence of the battery pack 20 and the installation of the battery pack 20 within a device D prior to passing current thereto. Further, the circuitry assures proper orientation between the charger contacts 42 and 44 with the respectively complementary terminus coupling 24. Still further, the control circuitry determines the ability of the battery 22 to withstand charging through measurement of the terminal voltage. It is appreciated that the charging process is optionally monitored by independent or simultaneous measurement or parameters including voltage, charging current, battery temperature, or charging duration. In a preferred embodiment, charging voltage is measured.

Provided such conditions of contact orientation and battery chargeability are met, the light emitting device 60 begins to flash steadily to indicate charging as current flows to the battery pack 20 and therefore to the device D, or otherwise communicate the status through a change in light emitting device illumination. The device D can operate during charging with surplus current flowing to charge the battery pack 20. The preferred embodiment includes a single indicator light emitting device 60, however a plurality of LEDs may be employed in the present invention without exceeding its scope.

Charging current is controlled while the voltage is being monitored. Optionally, thermal monitoring of the battery pack 20 also is accomplished by integrating a thermistor or equivalent means into the control circuitry.

Intermediate between the charger contacts 42 and 44 and the coupling 24 of the battery pack 20, a battery compartment cover 70 is provided having through holes 46 and 48 therein dimensioned such that contacts 42 and 44 penetrate therethrough in order to contact coupling 24. In this case, the through holes in the cover 70 establish a coupling point that allows the connector terminus to couple to the battery pack 20.

The cover 70 is preferably formed of injection molded thermoplastic material or a material similar to that from which the original device cover is formed. Most preferably, the cover 70 is formed of a transparent thermoplastic thereby affording visual confirmation that an inventive battery pack 20 is located within the device D.

Figure 2:
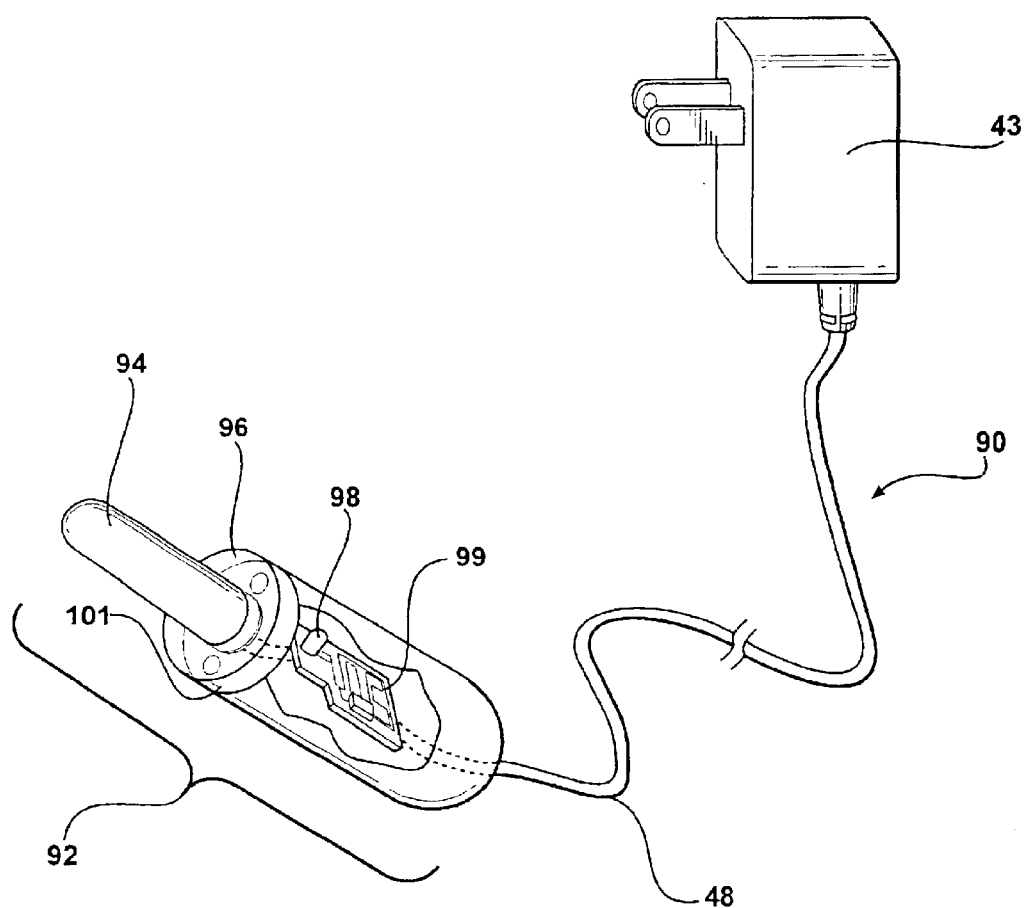
FIG. 2 is an illustrative view of a recharger according to the invention.

With reference to FIG. 2, a preferred embodiment of an inventive recharger is shown generally at 90. A transformer/converter 43 is electrically connected to a conductor 48 as described with respect to FIG. 1. The connector terminus 92 has a prong 94 adapted to insert within the charging port of a device D. The prong 94 is electrically conductive, and in electrical communication with the transformer/adapter 43 by way of conductive wire 48. About the base of the prong 94 is a translucent or transparent portion 96. Beneath the portion 96 lies at least one light emitting device 98. Preferably, the light emitting device is an LED. The light emitting device 98 is in electrical communication with the conductive wire 48 and the prong 94 with intermediate circuitry therebetween 99. Alternatively, the circuitry is located within the battery, the device or the power source adapter. The circuitry 99 activates the light emitting device 98 upon the prong 94 engaging the complementary receptacle of device D. The light output of the light emitting device 98 is transmitted through the portion 96 and illuminates the outer periphery 101 thereof. It is appreciated that the illumination may flash with a period, change color, change intensity, or otherwise change in a manner indicative of charge status of the device D. Further, it is appreciated that multiple light emitting devices are optionally incorporated into the recharger 90. Additional light emitting devices emit the same or different wavelengths. In instances where different emitting wavelength light emitting devices are present, it is appreciated that a controller circuit can adjust the output of the various light emitting devices so as to produce an overall color indicative of charge status.

Figure 3:
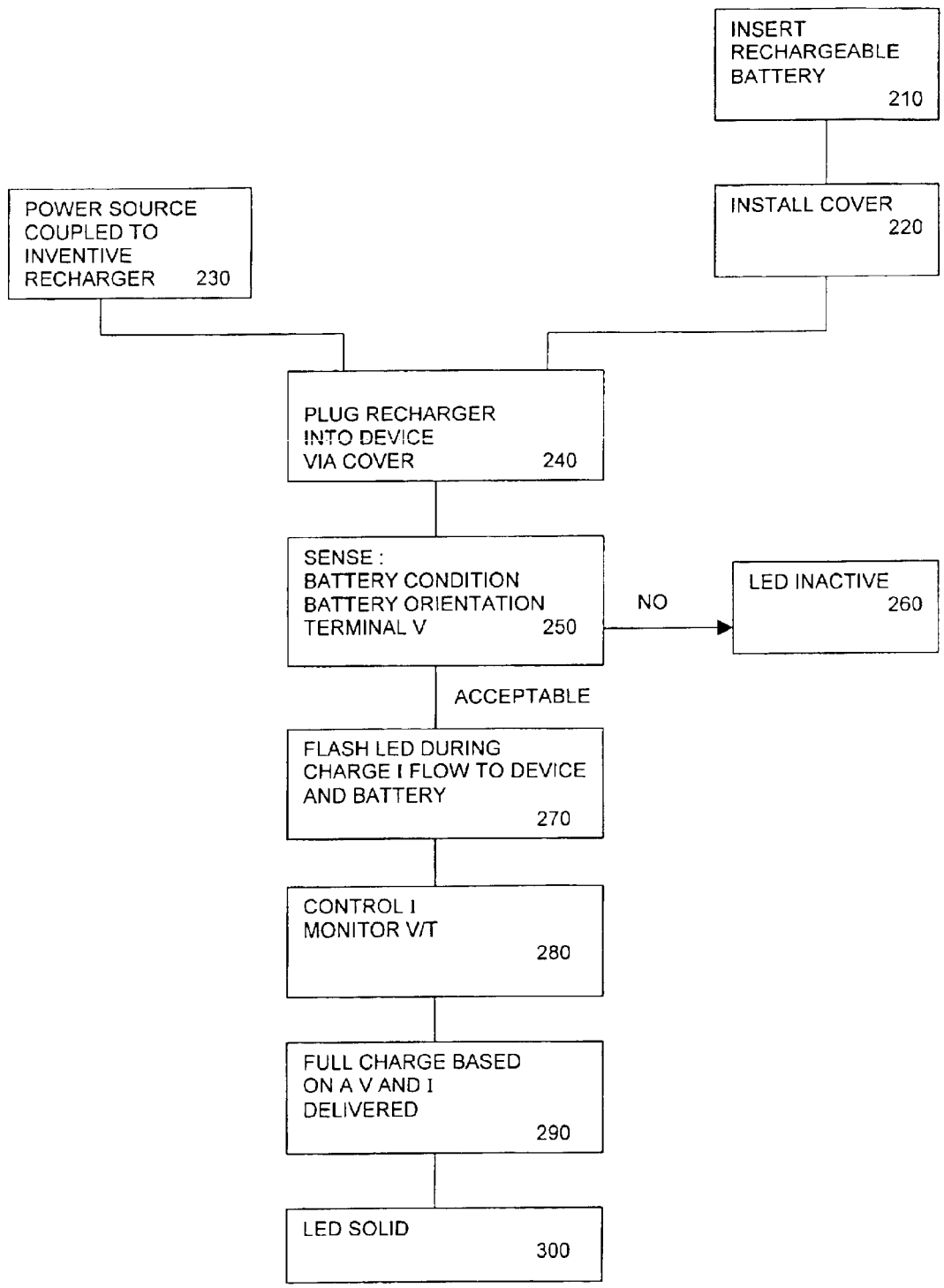
FIG. 3 is a block diagram illustrating process steps in recharging a device according to the present invention.

The process of installation and operation of the present invention in a portable electronic device intended to operate on disposable batteries is detailed in FIG. 3. The device battery cover is initially removed and a rechargeable battery pack 20 is installed instead 210. The rechargeable battery 20 illustratively includes nickel metal hydride, lithium, nickel cadmium and polymeric cells. Preferably the rechargeable battery is nickel metal hydride.

A replacement battery compartment cover 70 is installed over the rechargeable battery pack 220. The installed cover has apertures 46 and 48 therein to receive charger contacts 42 and 44 respectively therethrough aligned to engage the battery 20.

A power source such as line power, vehicle electrical power or solar cell is electrically coupled to the power adapter. In the case of an AC power source, a transformer or other conventional power modifying device having an inventive connector terminus containing an light emitting device in electrical communication therewith 230.

The contacts extending from the recharger terminal are then coupled to the rechargeable battery 20 by passing through the cover 240.

The control circuitry within the inventive charger senses the contact with the battery prior to placing a voltage across the charger contacts. The control circuitry also verifies contact orientation is correct for battery charging and further the ability of the battery to be charged by monitoring battery terminal voltage 250.

Should these conditions fail to be sensed by the charger circuitry, charging will not occur as indicated by a charger located light emitting device failing to light 260.

If charging conditions have been met, the light emitting device 60 flashes at a steady rate indicating charging has occurred through current flow to the battery and concurrently to the device 270. During charging the circuitry controls current flow while monitoring voltage, current, temperature and charge duration 280.

Upon the battery attaining full charge based upon monitored voltage and delivered current 290, the charger light emitting device stays continuously lit 300.

The foregoing description is illustrative of the particular embodiments of the invention but is not meant to be a limitation upon the practice thereof. The following claims, including all equivalents, are intended to define the scope of the invention.

I claim:

1. An improved recharger for a portable electronic device that includes a rechargeable battery having a power storage capacity, said battery being coupled with said device, a power source adapter that conditions source power for use by said device and said rechargeable battery, and a connector terminus in electrical communication with said power source adapter that couples to the rechargeable battery, said connector terminus being small in mass relative to the device such that the overall mass of the device remains substantially the same when the terminus is coupled to the device and wherein the improvement lies in:

a light emitting device affixed to said connector terminus and which is evident at least about an outer peripheral location of said connector terminus.

2. The improved recharger of claim 1 wherein said light emitting device activation frequency indicates the charging status of said battery.

3. The improved recharger of claim 1 wherein said light emitting device color indicates the charging status of said battery.

4. The improved recharger of claim 1 wherein a further improvement lies in a plurality of the light emitting devices.

5. The improved recharger of claim 1 wherein the improvement further lies in a translucent or transparent portion through which the light emitting device shines.

6. The improved recharger of claim 1 wherein the light emitting device emits a wavelength selected from the group consisting of: red, orange, yellow, green, blue, white, and violet.

7. A detachable recharger for a portable electronic device comprising:

a power source adapter;
   an insulated conductive wire extending from said adapter;
   a connector terminus in electrical communication with said wire, said terminus being supported by said portable electronic device upon coupling therewith; and
   a light emitting device proximal to said terminus and which is evident about an outer peripheral location of said connector terminus.

8. The recharger of claim 7 further comprising a plurality of said light emitting devices.

9. The recharger of claim 7 further comprising a translucent or transparent portion attached to said terminus.

10. The recharger of claim 7 wherein said light emitting device emits a wavelength selected from the group consisting of: red, orange, yellow, green, blue, white, and violet.

11. The recharger of claim 7 wherein said light emitting device indicates charge status of a battery through a mode selected from the group consisting of:

flashing, changing color, and changing intensity.

12. A detachable recharger for a portable electronic device comprising:

a power source adapter;

an insulated conductive wire extending from said adapter;

a connector terminus in electrical communication with said wire, said terminus being supported by said portable electronic device upon coupling therewith;

a light emitting device proximal to said terminus and evident about an outer peripheral location associated with said terminus; and charge control circuitry intermediate between said connector terminus and said light emitting device.

13. The recharger of claim 12 further comprising a plurality of said light emitting devices.

14. The recharger of claim 12 further comprising a translucent or transparent portion attached to said terminus.

15. The recharger of claim 12 wherein said light emitting device emits a wavelength selected from the group consisting of: red, orange, yellow, green, blue, white, and violet.

16. The recharger of claim 12 wherein said light emitting device indicates charge status of a battery through a mode selected from the group consisting of:

flashing, changing color, and changing intensity.

* * * * *